(12) United States Patent
Prado et al.

(10) Patent No.: US 12,585,532 B2
(45) Date of Patent: Mar. 24, 2026

(54) FRAMEWORK FOR SELECTING THRESHOLDS FOR ANOMALY DETECTION MODELS AND GENERATING QUANTITATIVE EXPLANATIONS

(71) Applicant: Dell Products L.P., Round Rock, TX (US)

(72) Inventors: Adriana Bechara Prado, Niterói (BR); Alexander Eulalio Robles Robles, Valinhos (BR); Eduarda Tatiane Caetano Chagas, Belo Horizonte (BR); Helen Cristina de Mattos Senefonte, Londrina (BR); Jonathan Mendes De Almeida, Brasília (BR); Karen Stéfany Martins, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 18/494,523

(22) Filed: Oct. 25, 2023

(65) Prior Publication Data

US 2025/0139246 A1 May 1, 2025

(51) Int. Cl.
*G06F 11/07* (2006.01)
*G06F 17/16* (2006.01)
(Continued)

(52) U.S. Cl.
CPC .......... *G06F 11/0793* (2013.01); *G06F 17/16* (2013.01); *G06F 18/15* (2023.01); (Continued)

(58) Field of Classification Search
CPC ............... G06F 11/0793; G06F 11/079; G06F 11/0772; G06F 11/0709; G06F 11/0751; G06F 18/15; G06F 16/2246; G06F 16/2465; G06F 18/22; G06F 17/16; G06F 11/3409; G06F 11/08; G06F 18/217; G06F 18/214; G06F 11/3452; G06F 11/3476; G06F 18/251; G06F 17/18; G06F 18/2113; (Continued)

(56) References Cited

U.S. PATENT DOCUMENTS

| | | | |
|---|---|---|---|
| 2019/0272339 A1* | 9/2019 | Wang | ....................... G06F 18/15 |
| 2020/0021511 A1* | 1/2020 | Xu | ........................ H04L 41/069 |

(Continued)

OTHER PUBLICATIONS

Yeh et al., "Matrix Profile I: All pairs similarity joins for time series: a unifying view that includes motifs, discords and shapelets", Proc' of 16th IEEE ICDM, 2016, pp. 1317-1322.
(Continued)

*Primary Examiner* — Kyung H Shin
(74) *Attorney, Agent, or Firm* — Workman Nydegger

(57) ABSTRACT

A framework for extracting quantitative and comparable explanations in terms of feature-value ranges for anomaly detection models based on outlier scores is disclosed. In a first phase, outlier scores are computed for a data set. In a second phase, thresholds per feature, which are used to identify abnormal entries or records in the data set, are extracted. In a third phase, a map between feature-outlier scores and feature-value ranges is generated. The feature-value ranges represent explanations. The explanations may include extracting quantitative metrics to explain a model.

20 Claims, 7 Drawing Sheets

(51) Int. Cl.

| | |
|---|---|
| *G06F 18/15* | (2023.01) |
| *G06F 18/22* | (2023.01) |
| *G06F 21/56* | (2013.01) |
| *G06F 21/57* | (2013.01) |
| *G06N 20/00* | (2019.01) |
| *H04L 9/40* | (2022.01) |
| *H04L 41/069* | (2022.01) |

(52) U.S. Cl.
CPC ............ *G06F 18/22* (2023.01); *G06F 21/566* (2013.01); *G06F 21/577* (2013.01); *G06N 20/00* (2019.01); *H04L 41/069* (2013.01); *H04L 63/1425* (2013.01); *G06F 2221/033* (2013.01)

(58) Field of Classification Search
CPC .... G06F 16/1824; G06F 16/13; G06F 40/169; G06F 40/40; G06F 40/30; G06F 40/35; H04L 63/1425; H04L 63/1416; H04L 41/069; H04L 41/145; H04L 43/50; H04L 41/065; H04L 43/08; H04W 4/70; G06N 20/10; G06N 20/00
See application file for complete search history.

(56) References Cited

U.S. PATENT DOCUMENTS

| | | | |
|---|---|---|---|
| 2020/0073740 A1* | 3/2020 | Ohana | G06F 11/0793 |
| 2020/0120122 A1* | 4/2020 | Du | H04L 63/1425 |
| 2022/0229721 A1* | 7/2022 | Rossi | G06F 17/16 |
| 2024/0202283 A1* | 6/2024 | Uflacker | G06F 18/22 |
| 2025/0086398 A1* | 3/2025 | Yang | G06N 20/00 |

OTHER PUBLICATIONS

P. Bailis, E. Gan, S. Madden, D. Narayanan, K. Rong, and S. Suri, "MacroBase: Prioritizing Attention in Fast Data." arXiv, Mar. 24, 2017. doi: 10.48550/arXiv.1603.00567.

J. Han, J. Pei, and Y. Yin. Mining frequent patterns without candidate generation. In SIGMOD, 2000.

Ribeiro, Marco Tulio, Sameer Singh, and Carlos Guestrin. "Why should i trust you?" Explaining the predictions of any classifier. Proceedings of the 22nd ACM SIGKDD international conference on knowledge discovery and data mining. 2016.

Lundberg, Scott M., and Su-In Lee. "A unified approach to interpreting model predictions." Advances in neural information processing systems 30 (2017).

V. Jacob, F. Song, A. Stiegler, B. Rad, Y. Diao, and N. Tatbul, "Exathlon: A Benchmark for Explainable Anomaly Detection over Time Series." arXiv, Sep. 5, 2021. doi: 10.48550/arXiv.2010.05073.

J. M. DeAlmeida et al., "Abnormal Behavior Detection Based on Traffic Pattern Categorization in Mobile Networks," IEEE Transactions on Network and Service Management, vol. 18, No. 4, pp. 4213-4224, Dec. 2021, doi: 10.1109/TNSM.2021.3125019.

A. Maske and B. Joglekar, "Survey on Frequent Item-Set Mining Approaches in Market Basket Analysis," in 2018 Fourth International Conference on Computing Communication Control and Automation (ICCUBEA), Aug. 2018, pp. 1-5. doi: 10.1109/ICCUBEA.2018.8697776.

C. F. T. Pontes, M. M. C. de Souza, J. J. C. Gondim, M. Bishop, and M. A. Marotta, "A New Method for Flow-Based Network Intrusion Detection Using the Inverse Potts Model," IEEE Transactions on Network and Service Management, vol. 18, No. 2, pp. 1125-1136, Jun. 2021, doi: 10.1109/TNSM.2021.3075503.

* cited by examiner

302

| 0_7 | 0_8 | 2_1 | 4_9 | 5_9 | 6_0 | 7_5 | 7_9 | ... | 8_6 | 9_6 | 11_3 | 14_9 | 15_2 | 15_3 | 16_9 | 17_9 | 18_0 |
|---|---|---|---|---|---|---|---|---|---|---|---|---|---|---|---|---|---|
| FALSE | FALSE | FALSE | FALSE | FALSE | FALSE | FALSE | FALSE | ... | FALSE | TRUE | TRUE | FALSE | FALSE | FALSE | FALSE | FALSE | FALSE |
| FALSE | FALSE | FALSE | FALSE | FALSE | FALSE | FALSE | FALSE | ... | FALSE | TRUE | TRUE | FALSE | FALSE | FALSE | FALSE | FALSE | FALSE |
| FALSE | FALSE | FALSE | FALSE | FALSE | FALSE | FALSE | FALSE | ... | FALSE | TRUE | TRUE | FALSE | FALSE | FALSE | FALSE | FALSE | FALSE |
| FALSE | FALSE | FALSE | FALSE | FALSE | FALSE | FALSE | FALSE | ... | TRUE | FALSE | FALSE | FALSE | FALSE | FALSE | FALSE | FALSE | FALSE |
| ... | ... | ... | ... | ... | ... | ... | ... | ... | ... | ... | ... | ... | ... | ... | ... | ... | ... |
| FALSE | FALSE | FALSE | FALSE | FALSE | FALSE | FALSE | FALSE | ... | FALSE | FALSE | FALSE | FALSE | FALSE | FALSE | FALSE | FALSE | FALSE |
| FALSE | FALSE | FALSE | FALSE | FALSE | FALSE | FALSE | FALSE | ... | FALSE | FALSE | FALSE | FALSE | FALSE | FALSE | FALSE | FALSE | FALSE |
| FALSE | FALSE | FALSE | FALSE | FALSE | FALSE | FALSE | FALSE | ... | FALSE | FALSE | FALSE | FALSE | FALSE | FALSE | FALSE | FALSE | FALSE |
| FALSE | FALSE | FALSE | FALSE | FALSE | FALSE | FALSE | FALSE | ... | FALSE | FALSE | FALSE | FALSE | FALSE | FALSE | FALSE | FALSE | FALSE |

304

| Support | Itemsets | Risk Ratio | Cardinality |
|---|---|---|---|
| 0.940299 | (17_9, 5_9, 16_9, 4_9) | 222.714844 | 4 |
| 0.940293 | (17_9, 5_9, 16_9) | 222.714844 | 3 |
| 0.940299 | (5_9, 16_9, 4_9) | 222.714844 | 3 |
| 0.940299 | (17_9, 5_9, 4_9) | 222.714844 | 3 |
| 0.940299 | (17_9, 16_9, 4_9) | 222.714844 | 3 |
| ... | ... | ... | ... |
| 0.44761 | (0_8, 4_9, 2_1) | 25.378378 | 3 |
| 0.44761 | (0_8, 5_9, 2_1) | 25.378378 | 3 |
| 0.44761 | (0_8, 16_9, 2_1) | 25.378378 | 3 |
| 0.44761 | (0_8, 17_9, 2_1) | 25.378378 | 3 |
| 0.44761 | (0_8, 2_1) | 25.378378 | 2 |

Figure 3A

```
"0_T1":{
        "anomalous_ranges":[
                        [
                                0.3546741321743174,
                                        Infinity
310                     ],
                        [
                                0.1995129375307302,
                                Infinity
                        ],
                        [
                                0.2897872415558965,
                                Infinity
                        ],
                        [
                                0.3120958803202672364,
                                Infinity
                        ]
        ],
        "important_fts":[
                        4,
                        16,
                        5,
                        17
        ]
}
```

Figure 3B

| Application | Anomaly Type | Conciseness | Consistency | Precision | Recall | F1 Score |
|---|---|---|---|---|---|---|
| 1 | 2,4,5 | 6.25 | 1.29 | 0.87 | 0.84 | 0.86 |
| 2 | 1,2,5,5 | 4.63 | 1.14 | 0.66 | 0.86 | 0.75 |
| 3 | 2,2,4,5 | 7.80 | 1.16 | 0.64 | 0.95 | 0.76 |
| 4 | 1,5 | 3.11 | 1.31 | 0.48 | 0.76 | 0.59 |
| 5 | 1,1,1,2,4,5 | 4.11 | 1.23 | 0.76 | 0.81 | 0.78 |
| 6 | 1,3,5 | 5.10 | 1.12 | 0.88 | 0.84 | 0.86 |
| 7 | 2,3,4,5 | 5.17 | 1.08 | 0.90 | 0.87 | 0.89 |

| Memory 602 | Storage Media 608 |
| NVRAM 604 | UI Device 610 |
| Processor 606 | Data Storage 612 |
| Application(s) 614 | |

FRAMEWORK FOR SELECTING THRESHOLDS FOR ANOMALY DETECTION MODELS AND GENERATING QUANTITATIVE EXPLANATIONS

FIELD OF THE INVENTION

Embodiments of the present invention generally relate to selecting thresholds for anomaly detection models and generating quantitative explanations. More particularly, at least some embodiments of the invention relate to systems, hardware, software, computer-readable media, and methods for detecting and explaining anomalies in data and/or applications.

BACKGROUND

Zero trust systems are generally configured to provide or enhance the security of a computing system. This is achieved, in effect, by requiring every user, application, and action to be verified, validated, or subject to security review. Trust in a user or application is not remembered in a zero trust system.

In order to further improve the performance of and security provided by a zero trust architecture, anomaly detection techniques may be used. Anomaly detection techniques generally focus on identifying abnormal events in time series data and generating alerts. When anomaly detection is operating, events, data, or the like that is identified as abnormal may trigger a security response. However, there is a strong possibility of generating a high number of false alerts. Discovering allegedly anomalous events without justification can hinder the remediation process and impact the effectiveness of the zero trust architecture.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3A discloses aspects of Boolean transactions and item sets, risk ratios, and cardinality;

FIG. 3B discloses aspects of an output that maps features and their anomalous ranges;

FIG. 5 discloses aspects of experimental results of applying embodiments of the invention to test data.

DETAILED DESCRIPTION OF SOME EXAMPLE EMBODIMENTS

Figure 1:
FIG. 1 discloses aspects of a framework that is executed in phases to detect anomalous data and generate quantitative explanations.

Embodiments of the present invention generally relate to anomaly detection. More particularly, at least some embodiments of the invention relate to systems, hardware, software, computer-readable media, and methods for anomaly detection models, anomaly detection thresholds and quantitative explanations in the context of anomaly detection.

Embodiments of the invention relate to anomaly detection operations configured to derive quantitative explanations in terms of, for example, attributes (e.g., feature-value) using a frequent pattern mining operation and further relate to anomaly detection operations that automatically define thresholds by which anomalies are identified.

Anomaly detection generally relates to identifying events, data (e.g., data points in time series data), or the like that are outliers or that deviate from normal or expected behavior. Embodiments of the invention relate to incorporating anomaly detection into zero trust systems. More specifically, anomaly detection may be applied to identify activities, actions, operations, or other aspects or behavior in a computing system that are different from the known good or normal behavior. Improving the ability to detect anomalous data or behavior accurately and with fewer false positives can improve the operation, security, and efficiency of a computing systems including zero trust computing systems.

In the context of generating explanations for system behaviors, XAI (Explainable Artificial Intelligence) generally includes model-agnostic methods and interpretable models. Model-agnostic methods separate explanations from the machine learning model and provide feature-based explanations that are generally based on data perturbation. The explanations are provided in terms of feature importance scores that indicate how much each feature contributes to the model's prediction.

Interpretable models, such as Generalized Linear Models, generate trackable information regarding how the model achieves a particular result. However, the interpretability of explanations is restricted to specialists able to understand the parameters of a regression of the outlier score value computed by the model, the reconstruction error computed by autoencoder solutions, and energy computed by quantum mechanics approaches. Because experts are not typical end-users of this type of application, generating explanations by/for non-experts is difficult. Embodiments of the invention overcome these issues and provide a framework that is configured to extract explanations and performance metrics based on outlier scores in a more understandable manner for end-users including non-expert users.

Embodiments of the invention relate to a framework or system that improves conventional anomaly detection models that are based on or rely on the computation of outlier scores. Embodiments of the invention incorporate frequent pattern mining (e.g., MacroBase) to find item sets with high support. Frequent pattern mining may include or generate a matrix from statistical epidemiology called relative risk ratio, which quantifies the probability that a data point is abnormal given that the data point relates to a specific combination of features that are different from or may be different from that of a normal population. To select combinations of features, the frequent pattern mining may use any frequent item set mining algorithm to set a minimum frequency (also referred to as support) to eliminate non-systemic combinations.

Embodiments of the invention are configured to identify frequent combinations of feature-outlier scores that correspond to abnormal events. The methods or operations for threshold selection and explainability may be performed in phases in one example.

FIG. 1 discloses example phases of performing threshold selection and/or explainability in anomaly detection. In phase one, outlier scores are computed 102 or determined from input data by performing an outlier determination operation. In one example, data such as a time series that includes a set F of features and a set T of timestamps is obtained. For each feature f in F, and each timestamp t in T, an outlier score may be determined using, by way of example, a visual-based interpretable anomaly detection method such as Matrix Profile. A numerical matrix containing outlier scores ($|F|\times|T|$) is returned by the outlier determination operation.

In a phase two 104, features and threshold ranges may be extracted from the matrix. In one example, a frequent pattern mining operation (e.g., MacroBase) is performed using the matrix $|F|\times|T|$ as input. More specifically, Boolean transactions based on the input matrix are generated and a frequent pattern mining algorithm, such as FPGrowth, is executed to mine for item sets with high support such as frequent conjunctions of outlier-score ranges. A risk ratio is computed for each item set and the item sets S are then sorted according to their risk ratio, support, and cardinality (e.g., number of conjunctions). The item sets with the best risk ratio, support, and cardinality are selected and stored as thresholds.

Phase three 106 includes computing at least explanations and explainability metrics. This may include mapping thresholds to feature-value ranges and storing these feature-value ranges as explanations. Quantitative metrics to measure conciseness, consistency, and accuracy of the explanations may be computed in the third phase 106.

Figure 2:
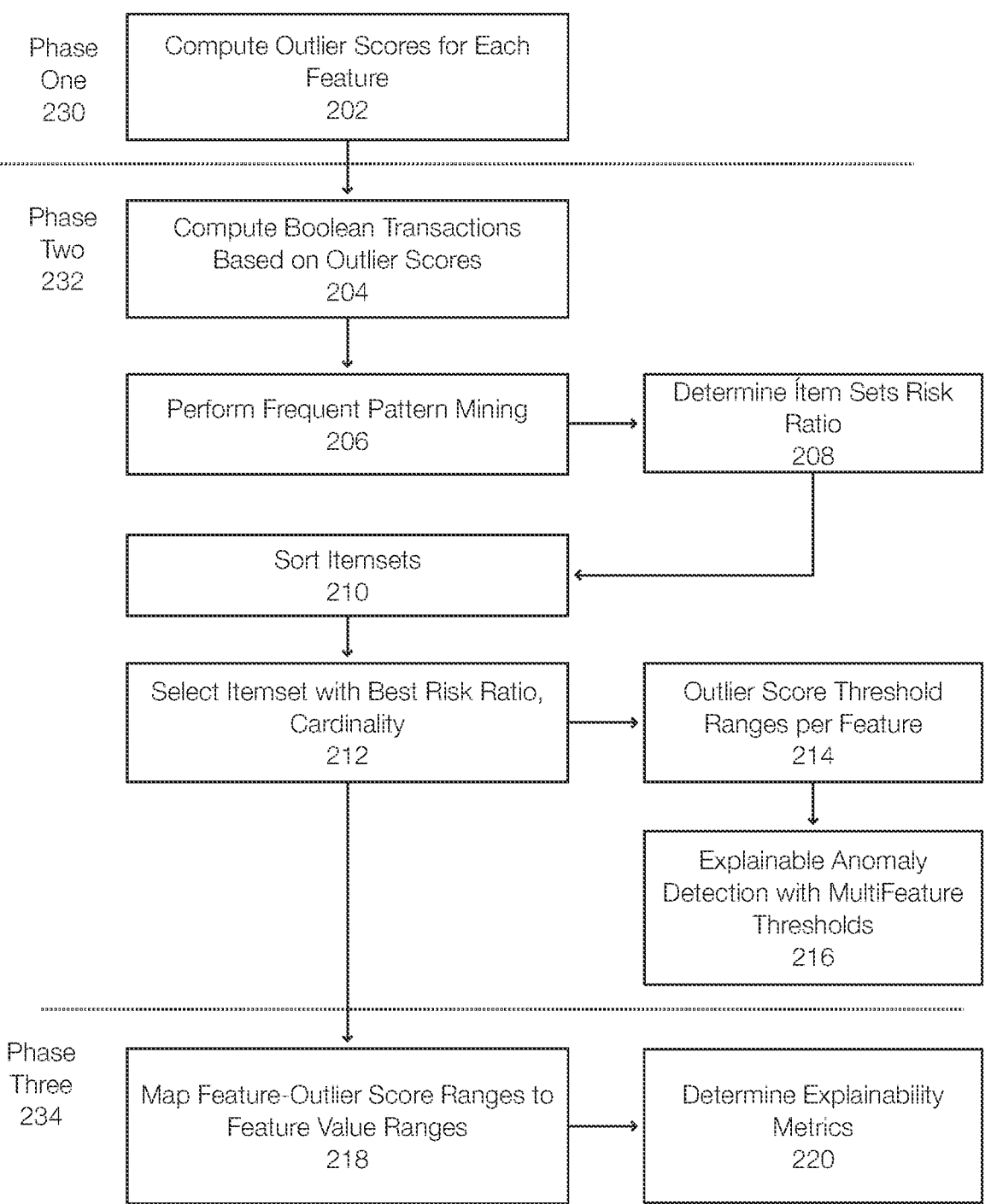
FIG. 2 discloses aspects of performing the phases of detecting anomalous data and generating quantitative explanations.

FIG. 2 discloses additional aspects of selecting thresholds and determining explainability in the context of anomaly detection. As previously stated, phase one 230, which is an example of phase one 102, includes computing 202 or determining outlier scores for each feature in input data or, in one example, for each feature at each timestamp when the input data is time series data. Determining outlier scores may include performing an anomaly detection operation to generate a matrix $|F|\times|T|$ that includes the outlier scores. Thus, for each feature, an outlier score is determined for each timestamp using a selected anomaly detection method.

In one example, the outlier scores are a distance profile calculated by the anomaly detection operation for the time series included in the input. In one example, the time series is partitioned into overlapping sliding windows of size w (an example of a hyperparameter used to determine the window size). The windows are used to determine a vector that stores a z-normalized Euclidean distance between each subsequence (sliding window) and it nearest non-self-match. In one example, the time series data are compared with small sub-sequences of itself. The sub-sequence of size w starts at a first index (i=0) of the time series and iterates along its $i^{th}$ positions until i=$|T|$−w−1.

Phase two 232, which is an example of the phase two 104, may receive the outlier scores, such as in the form of a matrix. Boolean transactions based on outlier scores are computed 204 in phase two 232. More specifically in one example, a ground truth may be available during a training process and Boolean transactions for normal and abnormal records are computed. The outlier scores for each feature are divided into bins (the number of bins may be user-defined) in phase two 232. The bins represent discrete threshold ranges. In one example, these Boolean transactions of features (feature-value ranges or bins) per timestamp are analogous to a market basket problem. Thus, Boolean transactions are computed based on the matrix output from phase one 230.

FIG. 3A is an example of Boolean transactions and item sets. The Boolean transactions 302 are associated, in one example, with a time series dataset. In the Boolean transactions 302, each row represents a timestamp and each column represents an item, in a format of <feature_id>, <bin_id>) or (feature, bin). Each value, true or false, represents the presence/absence of an item. In the Boolean transactions 302, for example, the value in the first column and first row (FALSE) indicates the absence of item 0_7 (or bin 7 of feature 0).

To reduce the number of Boolean transactions, a risk ratio (alpha) and an outlier minimum support (sigma) may be established. The minimum risk ratio is a predefined parameter that may be used to consider only the transactions with a sufficient risk ratio. This metric is related to statistical epidemiology, which describes a relative occurrence of key features (e.g., age, sex) among infected and healthy populations. In one example, the relative occurrence of key features among normal and abnormal events is described given a feature-bin combination. The risk ratio may be determined in one example as follows:

$$\text{risk ratio} = \frac{\frac{n_{outliers}}{(n_{outliers} + n_{inliers})}}{\frac{m_{outliers}}{(m_{outliers} + m_{inliers})}}.$$

In this example, n relates to the number of occurrences of outliers and inliers among the normal events and m relates to the number of occurrences in outliers and inliers among abnormal events. Each timestamp (entry) is separated according to the ground truth. Also, the outlier support is a user defined parameter between 0 and 1 and is used to optimize the frequent pattern mining operations.

The frequent item sets 304 are determined using a frequent pattern mining algorithm (e.g., FPGrowth). This operation returns item sets such as conjunctions of bins with support greater than or equal to sigma and a risk ratio greater than or equal to alpha. The minimum support and risk ratio may be determined by a user. These parameters allow frequent conjunctions of bins to be considered by removing conjunctions of bins corresponding to rare and non-systemic combinations. When the item sets 304 are determined, their risk ratios are determined. The item sets are then ordered in one example according to the risk ratio, support, and/or cardinality. The best item set may be selected and used, for example, to set thresholds.

The item sets 304 may be analogous to a market basket containing different items. In the item sets 304, the first row can be interpreted as a basket with four things. After sorting, this is the best item set and these four combinations of feature-bins are used in determining or identifying abnormal events. Each feature present in the selected item set and its respective outlier score range (threshold) may be used to provide explanations and may be used during the anomaly detection operation.

In order to obtain the threshold intervals for each relevant feature, the minimum and maximum bounds of each of the defined bins are evaluated. FIG. 3B discloses aspects of an output of phase two 232 and is an example of a dictionary 310 that maps features and their respective anomalous ranges.

More specifically and with reference to FIG. 2, Boolean transactions are computed 204 based on outlier scores generated in phase one 230. Frequent pattern mining is performed 206 on the Boolean transactions to identify item sets. A risk ratio is determined 208 from the item sets identified from the frequent pattern mining operation. The item sets may be sorted 210 based on risk ratio, support, and cardinality. The item sets with the best risk ratio, support, and cardinality, in one example, are selected 212 and outlier score thresholds ranges per feature are determined 214. This results in explainable anomaly detection with multifeatured thresholds 216. The output of phase two 232 may include a dictionary 310, such as illustrated in FIG. 3B.

Phase three 234, which is an example of phase three 106, may begin by receiving the dictionary output by phase two 232. In phase three 234, feature-outlier score ranges are mapped 218 to feature-value ranges. For example, if the anomaly detection operation is a Matrix Profile algorithm, the mapping procedure is performed after obtaining vectors containing the outlier scores and the indices indicating which subsequence generated the score related to the analyzed outlier.

The mapping procedure includes receiving as input the threshold intervals calculated in phase two 232, filtering the timestamp indexes of the distance profile vector that present values within the threshold intervals, and obtaining the subsequences related to these timestamp indexes. The feature-value range is composed of the minimum (lower bound) and maximum (upper bound) values present in the selected subsequences.

After mapping feature-outlier scores to feature-value ranges, important feature-value ranges are stored as a dictionary of relevant features along with the respective value ranges. With these ranges as explanations, the reasons for classifying an event as an anomaly can be determined. An anomaly is detected if all relevant feature-values are within abnormal ranges. In other words, the feature-value ranges can be used as a prediction method to detect anomalies in any time series. Further, with explanations in this format, performance metrics such as conciseness, consistency, and accuracy, and be determined 220 for the explanations.

Lastly, using the output obtained from mapping between feature-outlier score ranges and feature-value ranges, quantitative metrics are determined 220 for the computed explanations 216. In one example, quantitative metrics for the explanations may include conciseness, consistency, and accuracy. Conciseness corresponds to the number of features used in the explanation. For a global explanation (a set of explanations), the conciseness measure is the average of the size of each explanation. Consistency evaluates whether anomalies of the same type occurring in a similar context have consistent explanation (i.e., the relevant features are the same in similar situations). Finally, accuracy is measured using the explanations of an anomaly as thresholds for the outlier scores computed for a previously unseen time series, and then evaluating the accuracy of such predictions. In one example, an instance is classified as abnormal if the values of its relevant features are within the ranges defined by the computed thresholds.

Figure 4:
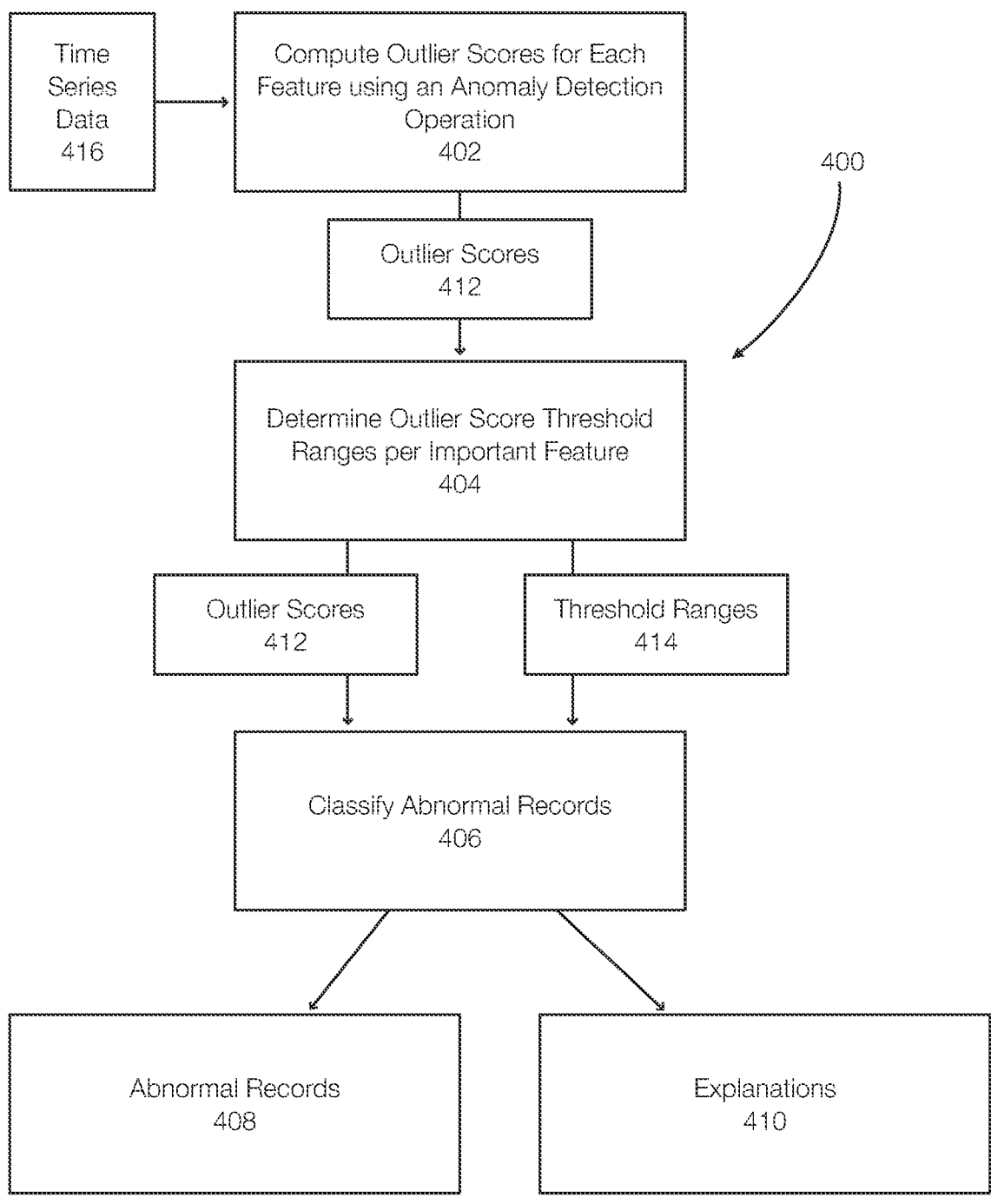
FIG. 4 discloses aspects of identifying abnormal events or records, explanations, and quantitative metrics.

FIG. 4 discloses aspects of generating explanations and quantitative metrics. The method 400 includes receiving time series data 416 and computing 402 outlier scores for each feature using an anomaly detection operation or algorithm. The output, which includes outlier scores 412, is input to a second phase that include determining 404 outlier score threshold ranges for each important feature. The important features were determined using frequent pattern mining in one example.

The output of this phase includes the outlier scores 412 and threshold ranges 414. The outlier scores 412 and threshold ranges 414 allow records (or data points) to be classified.

Abnormal records 408 may be stored. The important features and threshold ranges are examples of explanations 410.

FIG. 5 illustrates an experiment and results. In this example, Matrix Profile is used as an anomaly detection algorithm and an open-source anomaly detection benchmark was used for explicability.

The dataset used in this experiment was constructed using real data traces collected from a user case scenario implemented on Apache Spark. This dataset is composed of data generated by Spark streaming applications. For example, an application that counts the number of clicks for each user within the last batch is an example application.

The data collected from each execution of an application includes a trace that can be disturbed or undisturbed. A disturbed trace includes abnormal events and undisturbed trace does not include abnormal events.

In order to create an anomaly detection benchmark (i.e., a dataset with ground truths for all existing anomalies (disturbed traces)), anomalies were injected into this dataset. Undisturbed traces were generated to characterize the normal execution behavior and then several anomalous events were injected to generate disturbed traces. The disturbed traces are divided into five categories.

Bursty input: this type of anomaly injection simulates input rate spikes. To create this kind of disturbed trace, a disruptive event generator (DEG) is executed to temporarily increase the input rate during 15 to 30 minutes.

Bursty input until crash: this is an extended version of the first category. In this case, the DEG period runs until crashing due to lack of memory.

Stalled input: this category simulates failures of Spark data sources (e.g., Kafka). To create it, a DEG sets the input rates to 0 for 15 minutes and repeats it periodically every few hours.

CPU contention: this category of abnormal trace represents scheduling delays due to CPU contention. A DEG that runs Python scripts created to consume all CPU cores is used to create this kind of disturbed trace.

Driver/executor failure: this category represents anomalies due to hardware faults or maintenance operations that may cause a node to fail abruptly, turning all processes unreachable. This anomaly was injected by reducing the number of processed records to 0 until the driver comes back up again after 20 seconds (and 10 seconds in the case of executor failure).

Embodiments of the invention used traces from 7 different stream processing applications and 19 features, including disturbed traces from all categories described above. For more details regarding the dataset used in the benchmark, please refer to V. Jacob, F. Song, A. Stiegler, B. Rad, Y. Diao, and N. Tatbul, "Exathlon: A Benchmark for Explainable Anomaly Detection over Time Series." arXiv, Sep. 5, 2021. doi: 10.48550/arXiv.2010.05073, which is incorporated by reference in its entirety.

As previously stated, embodiments of the invention used Matrix Profile as the anomaly detection algorithm. The results are illustrated in FIG. 5, which discloses aspects of performance metrics using embodiments of the invention. In the table 500, the column "anomaly type" indicates the different categories of disturbed traces present in each application. As illustrated in FIG. 5, a disturbed trace from a same category can occur more than once in a given application. For instance, there are three occurrences of "bursty input" (type 1) in application 5. The subsequent columns indicate the average of the explanation metrics for conciseness, consistency, and accuracy in terms of precision, recall, and F1 score.

Using embodiments of the framework disclosed herein, performance metrics for the explainability of outlier scores generated by Matrix Profile are generated. The results in the table 500 suggests that Matrix Profile is relatively concise, considering that 19 features were used and that the explanations resulted in 5 features on average. However, the conciseness metric should be analyzed together with consistency. Humans usually prefer concise explanations, i.e., usually conciseness should favor smaller, and thus simpler explanations (which are easier for humans to understand). Also, the conciseness appears to have a direct impact on the consistency metric. In these results, the lack of conciseness of Matrix Profile resulted in a poor consistency.

Finally, considering the accuracy metrics (precision, recall, and F1 score) computed with cross validation procedure, Matrix Profile presented good results on average. In particular, Matrix Profile presented great recall results on average, which suggests that Matrix Profile can be characterized as a solution that would prioritize true positive rates. However, this characteristic has advantages and disadvantages.

For example, security or zero trust architectures must not miss abnormal events and optimizing true positive rates (recall) can be considered a priority when compared to minimizing false positives. On the other hand, providing a large number of false positive occurrences can generate an overhead, for example, for network administrators. Therefore, it may be advantageous to balance these two metrics (F1 score) when selecting a proper anomaly detection algorithm for a zero trust system. Embodiments of the invention can be used with other anomaly detection algorithms including those that are outlier-score based.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, anomaly detection operations, threshold determination operations, quantitative explanation operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers, clients, and the like, for example, may likewise take the form of software, physical machines, containers, or virtual machines (VM), though no particular component implementation is required for any embodiment.

Example embodiments of the invention are applicable to any system capable of storing and handling various types of objects, in analog, digital, or other form.

It is noted with respect to the disclosed methods, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method, comprising: computing outlier scores for each feature of a data set received at a computing system, determining Boolean transactions based on the outlier scores, performing a frequent pattern mining on the Boolean transactions to generate item sets, sorting the item sets based on one or more of support, risk ratios of the item sets, and/or cardinalities of the item sets, identifying outlier score threshold ranges per features, and generating explanations by mapping feature-outlier ranges to feature-value ranges.

Embodiment 2. The method of embodiment 1, wherein the data set comprises a time series data set.

Embodiment 3. The method of embodiment 1 and/or 2, wherein the Boolean transactions are based on a ground truth.

Embodiment 4. The method of embodiment 1, 2, and/or 3, further comprising dividing the outlier scores into bins that represent discrete threshold ranges.

Embodiment 5. The method of embodiment 1, 2, 3, and/or 4, wherein the Boolean transaction are generated per timestamp.

Embodiment 6. The method of embodiment 1, 2, 3, 4, and/or 5, reducing a number of the Boolean transactions by setting a risk ratio value and a minimum support value per feature.

Embodiment 7. The method of embodiment 1, 2, 3, 4, 5, and/or 6, wherein the item sets include frequent item sets based on conjunctions of bins with support greater than or equal to the minimum support value and a risk ratio greater than or equal to the risk ratio value.

Embodiment 8. The method of embodiment 1, 2, 3, 4, 5, 6, and/or 7, further comprising generating a dictionary that identifies the feature-value ranges.

Embodiment 9. The method of embodiment 1, 2, 3, 4, 5, 6, 7, and/or 8, further comprising mapping the feature-outlier ranges to the feature-value ranges by receiving threshold intervals of the features, filtering timestamp indexes of a distance profile vector that present values within the threshold intervals, and obtaining subsequences related to the timestamp indexes, wherein the feature-value ranges is composed of minimum and maximum values present in the selected subsequences.

Embodiment 10. The method of embodiment 1, 2, 3, 4, 5, 6, 7, 8, and/or 9, further comprising classifying anomalies in the data set and generating performance metrics for the explanations, the performance metrics including conciseness, consistency and accuracy.

Embodiment 11. The method as recited in any of embodiments 1-10 or combinations thereof.

Embodiment 12 A system, comprising hardware and/or software, operable to perform any of the operations, methods, or processes, or any portion of any of these, disclosed herein.

Embodiment 13 A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
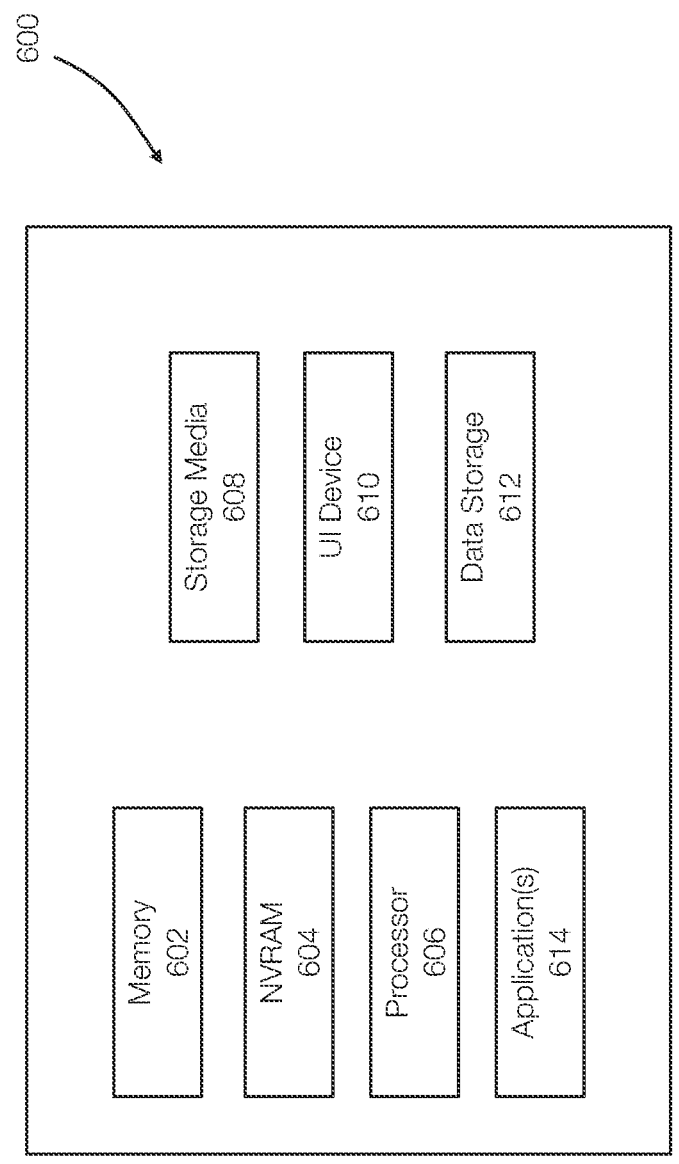
FIG. 6 discloses aspects of a computing device, system, or entity.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
computing outlier scores for each feature of a data set received at a computing system, wherein each outlier score corresponds to a z-normalized distance value computed for subsequences of a time-series portion of the data set;
determining Boolean transactions based on the outlier scores by dividing the outlier scores into bins representing discrete threshold ranges per feature and generating, for each timestamp, a Boolean transaction indicating whether each feature's outlier score falls within a corresponding bin;
performing a frequent pattern mining on the Boolean transactions to generate item sets comprising conjunctions of feature-bin pairs having support greater than or equal to a minimum support threshold and risk ratio greater than or equal to a predefined risk ratio value;
sorting the item sets based on one or more of support, risk ratios of the item sets, and/or cardinalities of the item sets;
identifying outlier score threshold ranges per features based on the selected item sets; and
generating explanations by mapping feature-outlier ranges to feature-value ranges by filtering timestamp indexes of a distance profile vector corresponding to values within the threshold ranges and obtaining subsequences related to those timestamp indexes to determine minimum and maximum feature values for each feature-value range.

2. The method of claim 1, wherein the data set comprises a time series data set.

3. The method of claim 1, wherein the Boolean transactions are based on a ground truth.

4. The method of claim 1, further comprising dividing the outlier scores into bins that represent discrete threshold ranges by adaptively partitioning the outlier scores per feature based on distribution characteristics of the corresponding feature values.

5. The method of claim 4, wherein the Boolean transactions are generated per timestamp for each timestamp within overlapping sliding windows of a defined window size corresponding to subsequences of the time-series data set.

6. The method of claim 1, reducing a number of the Boolean transactions by setting a risk ratio value and a minimum support value per feature.

7. The method of claim 6, wherein the item sets include frequent item sets based on conjunctions of bins with support greater than or equal to the minimum support value and a risk ratio greater than or equal to the risk ratio value.

8. The method of claim 1, further comprising generating a dictionary that identifies the feature-value ranges.

9. The method of claim 1, further comprising mapping the feature-outlier ranges to the feature-value ranges by receiving threshold intervals of the features, filtering timestamp indexes of a distance profile vector that present values within the threshold intervals, and obtaining subsequences related to the timestamp indexes, wherein the feature-value ranges is composed of minimum and maximum values present in the selected subsequences by aggregating the values of subsequences identified from the distance profile vector to compute minimum and maximum feature values corresponding to each outlier threshold range.

10. The method of claim 1, further comprising classifying anomalies in the data set and generating performance metrics for the explanations, the performance metrics including conciseness, consistency and accuracy.

11. A non-transitory storage medium having stored therein instructions that are executable by one or more hardware processors to perform operations comprising:
computing outlier scores for each feature of a data set received at a computing system, wherein each outlier score corresponds to a z-normalized distance value computed for subsequences of a time-series portion of the data set;

determining Boolean transactions based on the outlier scores by dividing the outlier scores into bins representing discrete threshold ranges per feature and generating, for each timestamp, a Boolean transaction indicating whether each feature's outlier score falls within a corresponding bin;

performing a frequent pattern mining on the Boolean transactions to generate item sets comprising conjunctions of feature-bin pairs having support greater than or equal to a minimum support threshold and risk ratio greater than or equal to a predefined risk ratio value;

sorting the item sets based on one or more of support, risk ratios of the item sets, and/or cardinalities of the item sets;

identifying outlier score threshold ranges per features based on the selected item sets; and generating explanations by mapping feature-outlier ranges to feature-value ranges by filtering timestamp indexes of a distance profile vector corresponding to values within the threshold ranges and obtaining subsequences related to those timestamp indexes to determine minimum and maximum feature values for each feature-value range.

12. The non-transitory storage medium of claim 11, wherein the data set comprises a time series data set.

13. The non-transitory storage medium of claim 11, wherein the Boolean transactions are based on a ground truth.

14. The non-transitory storage medium of claim 11, further comprising dividing the outlier scores into bins that represent discrete threshold ranges by adaptively partitioning the outlier scores per feature based on distribution characteristics of the corresponding feature values.

15. The non-transitory storage medium of claim 14, wherein the Boolean transaction are generated per timestamp for each timestamp within overlapping sliding windows of a defined window size corresponding to subsequences of the time-series data set.

16. The non-transitory storage medium of claim 11, reducing a number of the Boolean transactions by setting a risk ratio value and a minimum support value per feature.

17. The non-transitory storage medium of claim 16, wherein the item sets include frequent item sets based on conjunctions of bins with support greater than or equal to the minimum support value and a risk ratio greater than or equal to the risk ratio value.

18. The non-transitory storage medium of claim 11, further comprising generating a dictionary that identifies the feature-value ranges.

19. The non-transitory storage medium of claim 11, further comprising mapping the feature-outlier ranges to the feature-value ranges by receiving threshold intervals of the features, filtering timestamp indexes of a distance profile vector that present values within the threshold intervals, and obtaining subsequences related to the timestamp indexes, wherein the feature-value ranges is composed of minimum and maximum values present in the selected subsequences by aggregating the values of subsequences identified from the distance profile vector to compute minimum and maximum feature values corresponding to each outlier threshold range.

20. The non-transitory storage medium of claim 11, further comprising classifying anomalies in the data set and generating performance metrics for the explanations, the performance metrics including conciseness, consistency and accuracy.

* * * * *